Figure 1:
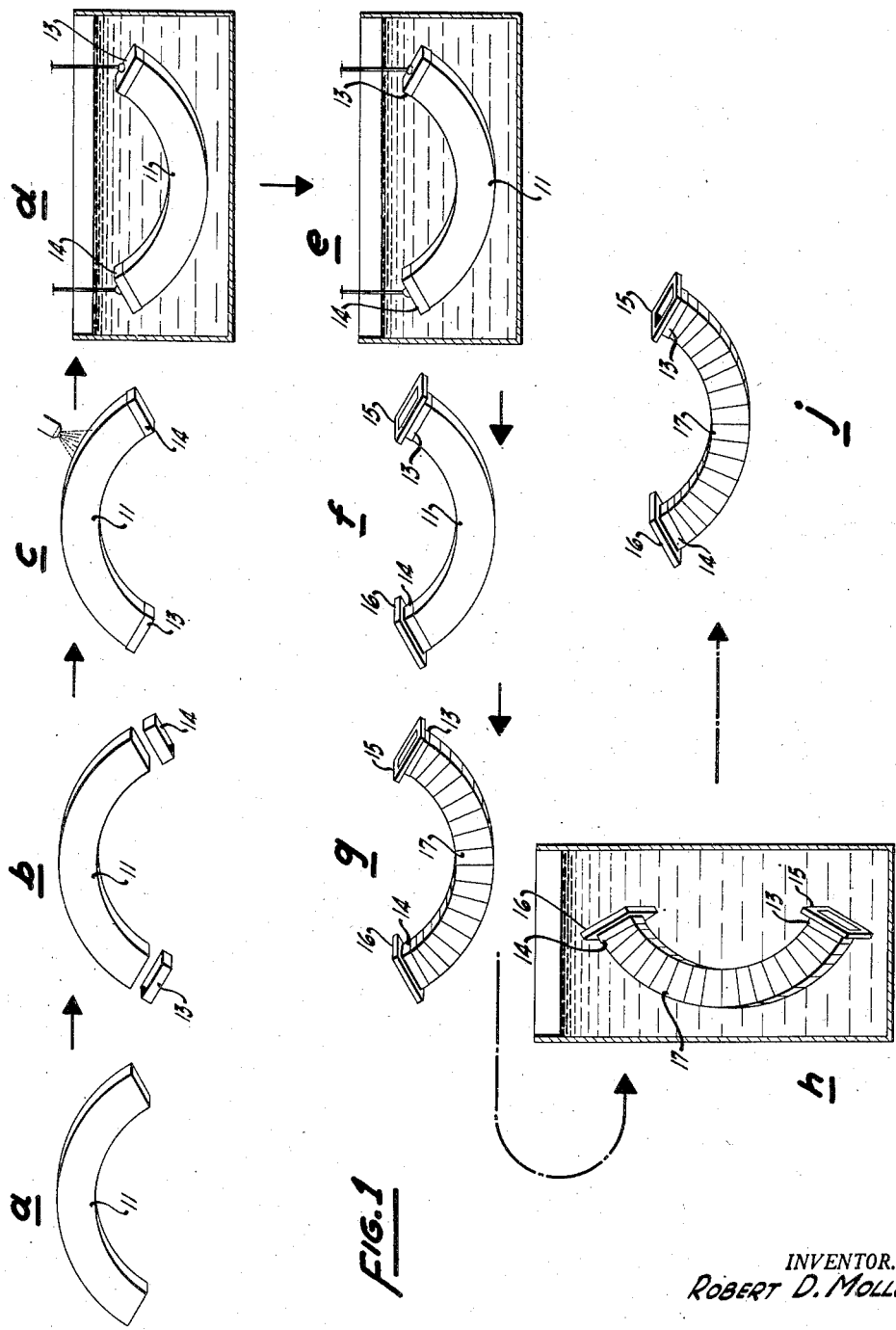

United States Patent Office 2,826,524
Patented Mar. 11, 1958

2,826,524

METHOD OF FORMING WAVE GUIDES

Robert D. Molloy, Redwood City, Calif., assignor, by mesne assignments, to Textron Inc., Providence, R. I., a corporation of Rhode Island Application February 8, 1955, Serial No. 486,945

8 Claims. (Cl. 154—83)

This invention relates to wave-transmitting elements of the sort frequently referred to in the art as a hollow waveguide, a feed horn, and the like. Electrical signalling waves have wave lengths which are extremely short, and generally of considerably less length than one meter, are passed through components of this sort for signalling purposes.

In the formation of the mentioned type of wave-transmitting element, the formed component may, generally speaking, be of tubular configuration, or at least internally hollow, to provide a path through which the wave energy is propagated. It is desirable to form the wave-transmitting element with its external surfaces completely smooth and to take into account the fact that the wave-transmitting element or waveguide may be required to change its configuration or its direction to substantial extent. It is difficult to fabricate such components and at the same time to provide a completely smooth, joint-free surface in the absence of an internal mandrel about which the waveguide structure or wave-transmitting element is formed.

The art has already known that certain forms of wave-transmitting elements and waveguides may be built by providing an internal mandrel which can have its surface extremely accurately formed into any desired shape, and that such a surface may be provided by molding, extruding, carving, shaping or forming the mandrel in any other manner. The waveguide, horn, or the like, is then built around the mandrel. The formed mandrel for such use should be of disposable character so that it can be removed from the completed waveguide. Illustratively, the mandrel may be removed mechanically, or it may be melted by heating, or it may be dissolved by an acid or other substance in some composition in which it is soluble or becomes soluble through chemical action.

One of the novel features of the present invention is particularly that of applying a metal coating or film on the mandrel in such a way that an inside surface of the applied metal shall coincide substantially with the outer surface of the mandrel. Upon this metal coating there is applied a glass cloth or tape in one or more layers into which may be applied, if desired, a stiffening or reinforcing component and upon which may be coated one of the epon or epoxy resins for bonding and supplying body, after which the mandrel is suitably removed.

The invention has included in its objects those of providing a simpler construction of wave-transmitting elements particularly adapted to the transmission of microwaves and having an interior in the form of a continuous metal surface without joints, which is reinforced by suitable stiffening; and the fabrication in an inexpensive manner of wave-transmitting elements of the waveguide and feed horn type which can be rapidly manufactured and which can be formed precisely to correspond to desired templates.

A further object of the invention is the formation of a light-weight wave-transmitting element of a type such that complex shapes, which are difficult, time-consuming and expensive to make by present conventional methods, may be made quickly and with ease.

Figure 2:
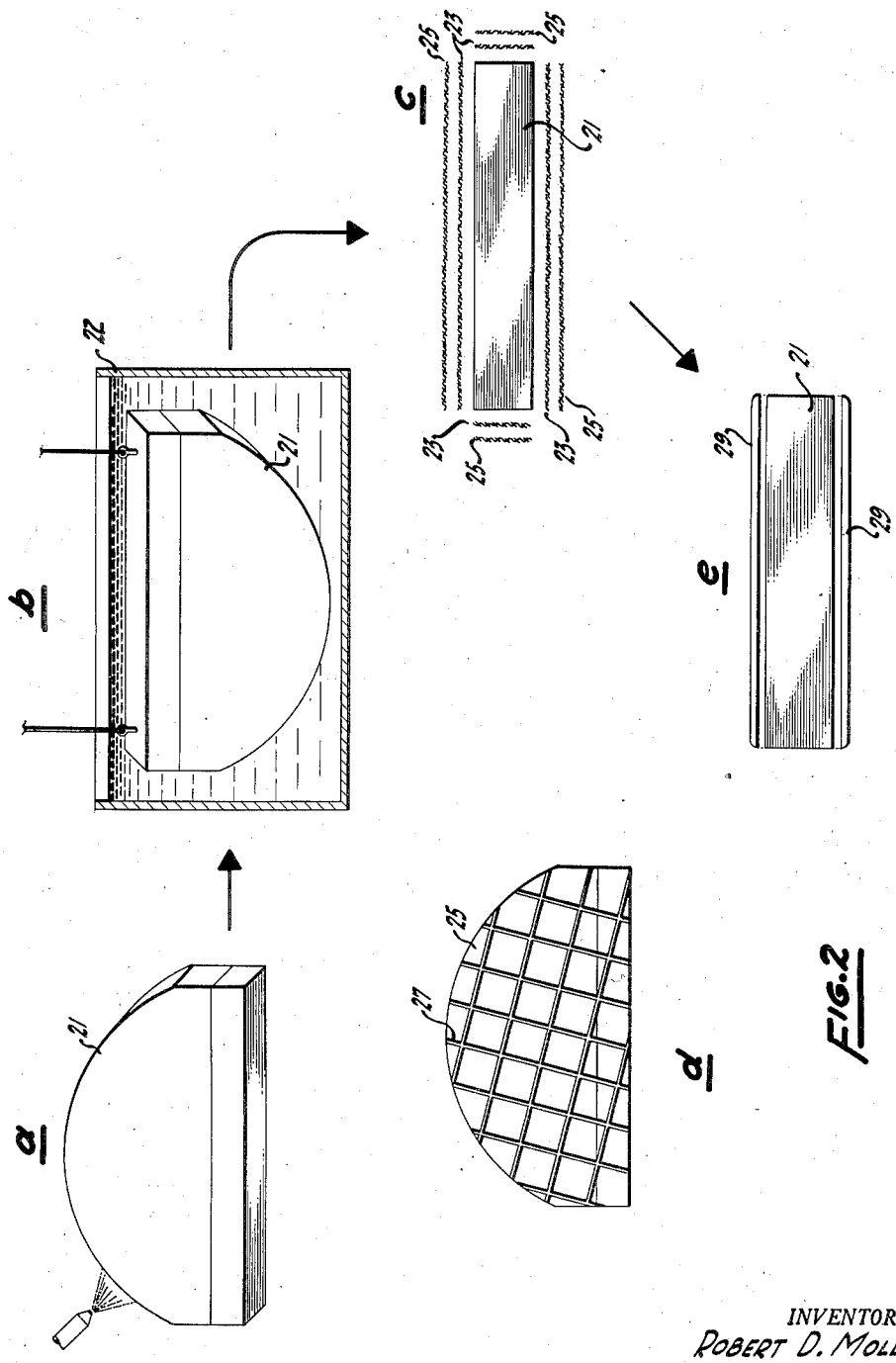

Other objects of the invention will become apparent and suggest themselves to those skilled in the art from a consideration of the drawings, in which Fig. 1 schematically illustrates by its parts *a* through *i* suitable steps in the method of forming a waveguide, and in which Fig. 2 illustrates in schematic manner by its parts *a* through *e* suitable steps to form a feed horn.

Making reference now to Fig. 1, there is shown by part *a* thereof, in schematic form, a disposable core 11 of a waveguide, which core may be formed of dissolvable gypsum, low-melting alloys, or other disposable components. The core may be formed extremely accurately by casting, extruding, shaping, machining, carving, or otherwise shaping it, so that its outer surfaces are precisely smooth, whereby the contour of the external surface of the core constitutes the complement of the internal surface of the waveguide desired to be formed.

With the formation of the core 11 it is desirable to apply at the ends thereof, as shown by part *b* of Fig. 1, metal ferrules 13 and 14. While there is a wide variance of metals that may be selected for the ferrules, it is important that the selected metal shall not be affected by the plating and core removing solutions to be employed, and that the ferrules shall become a means for attaching flanges by which connection of the completed wave-transmitting element or waveguide to other electrical components is established. To provide a conductive surface for the internal core about which the wave-transmitting element is formed, it is frequently desirable to apply to its outer surface a suitable conducting coat, such as that obtained by spraying the core (as shown by portion *c* of this figure) with a mixture of silver and butyl-acetate. This mixture acts as both a conducting coat for electro-plating and as a parting agent at a later point in the process. The final silver coating, which provides a low loss surface for any electrical waves propagated through the structure when formed and in use, is formed initially as a conductive core coating by immersing the coated core in an electro-plating bath, such as that indicated by sketch *d* of Fig. 1. The electrical connection for electro-plating is established at the metal ferrules, such as the ferrules 13 and 14, and a silver coating or film of desired thickness may be applied in well known plating practice to form a highly conductive inner surface of the waveguide that is being manufactured.

The silver film or coat applied is, of itself extremely thin and of such thickness that it is incapable of being self-sustaining as a support. Therefore, to strengthen and to hold the shape of the wave-transmitting element or waveguide for subsequent operations, the coated core, after formation and silver plating, is preferably next immersed in an electro-plating bath as shown by part *e* of Fig. 1 so that a copper coating may be applied as a strengthening structure upon the silver film. In all parts *c*, *d* and *e* of Fig. 1, the films or metallic coats applied are not indicated by numerical designation but it will be understood they are built up as layers, one on top of the other.

After the formation of the copper coating of desired thickness upon the silver film, it is next desirable to attach to the metal ferrules 13 and 14, which are secured at the end of the waveguide, a suitable pair of connecting flanges 15 and 16. These flanges are usually formed from magnesium or any other suitable metal and are used to make connection of the waveguide to other components from which and to which the electro-magnetic wave energy is to be transmitted. Attachment may be provided by various means, such as silver cement. With the completion of the attachment of the magnesium flanges 15 and 16 and the formation of the silver and copper coating over the core and the end ferrules, the coated core is next wrapped, as shown by Fig. 1g, with a glass tape or cloth (illustratively, a component known in the art as "Fiberglas") and, if desired, a metal adhesive. The glass tape wrapping is conventionally represented at 17.

Upon this combination there is applied, in order to bond the glass cloth or tape wrappings in a suitable laminated structure, epon resins which distribute themselves between the layers and form the combined assembly into a substantially solid mass. The curing in this instance may be done in a vacuum with low heat.

Part h of Fig. 1 illustratively indicates a means to remove the internal core by hot water immersion to leave the completed waveguide or wave-transmitting element as schematically represented, for instance, by portion i of Fig. 1. There is thus formed with the removal of the core a completely smooth coating of silver within the outer shell of glass cloth suitably held. The shape of the formed component may be curved or include various angular bends or twists, as desired, to insure maximum efficiency in the passage of electro-magnetic waves therethrough.

It has been suggested in what has gone before that the mandrel or core shall be of gypsum, but it will be understood that various other core materials may be used, such as plaster of Paris or various metals, including lead, cerrobend and cerromatrix. Likewise, while removal by water immersion of the core is disclosed by sketch h of Fig. 1, it will also be understood that the core may in some instances be mechanically withdrawn or the core may be formed of a metal or other substance which can be dissolved in acids, as desired. The utilization of butyl-acetate in the initially applied metallic sprayed coating acts as both a thinning and parting agent readily to release the silver from the mandrel or core, and curing in a vacuum, as hereinbefore explained, aids in molding the laminate about the core.

By Fig. 2 various modifications of the invention are shown illustratively as applied to the formation of an electro-formed feed horn to provide an interior of one continuous piece of silver without joints. Following in accordance with the showing of Fig. 1, part a of Fig. 2 shows the mandrel or core 21 in side view and schematically represents silver spraying with butyl-acetate, as already explained. In order to provide a conductive coating upon the outer surface of the mandrel, part b of Fig. 2 illustrates, in a fashion similar to that shown by part d of Fig. 1, the plating of silver onto the coated mandrel by immersing the mandrel 21 into a silver plating bath schematically shown at 22.

With the formation of the silver plate upon its outer surface the mandrel, like Fig. 1, may be wrapped suitably with a glass cloth in a varying number of layers of which the layer 23 forms the innermost layer and one layer 25 forms another layer, as shown. In part c of Fig. 2 there has been represented in generally exploded form the front view of the mandrel with the sectional indications representing the formed core about which a glass cloth has been covered, generally by wrapping. By part d of Fig. 2 there is schematically represented a side view of the mandrel with still another layer 27 of glass cloth thereon for further stiffening. For example, layer 27 may be a coarser and stiffer cloth than layers 23 and 25, as is indicated by the relatively larger mesh size of layer 27. As was already explained, upon this coating a suitable epoxy resin is then applied to secure the entire assembly—the reinforcing glass and resin structure 29 about the mandrel 21— as schematically represented by part e of Fig. 2. Again the mandrel then may be removed mechanically or by suitable dissolution or in any other fashion to leave the guide element formed in accordance with the method steps already outlined with respect to the discussion of Fig. 1. Various modifications of the invention of course will be apparent to those skilled in the art to which it is directed.

What is claimed is:

1. The method of forming a wave-transmitting element, comprising the steps of electro-plating a mandrel with a conductive coat, covering the conductively coated mandrel with a fibrous material, securing the fibrous material about the electro-plated surface with an epoxy resin, and removing the mandrel.

2. The method of forming a wave-transmitting element, comprising the steps of electro-plating a mandrel with a conductive coat, covering said conductive coat with a glass cloth, securing the glass cloth about the electro-plated surface with an epoxy resin, and removing the mandrel.

3. The method of forming a wave-transmitting element, which comprises applying a conductive coating upon a mandrel having external surface characteristics coinciding with the desired internal configuration of the wave-transmitting element to be formed, covering the coated mandrel with a glass cloth, applying a resinous bonding agent to the glass cloth, curing said bonding agent, and subsequently removing the mandrel.

4. The method of forming a waveguide, comprising the steps of applying metal ferrules to the ends of a removable core having an outer contour corresponding to that desired for the internal surface of a waveguide, metallizing the outer surface of the core, silver plating the metallized surface, wrapping a glass cloth about the core, reinforcing the glass cloth for rigidity with a resinous bonding agent, curing said resinous bonding agent and subsequently removing the core.

5. The method of forming a waveguide, comprising the steps of applying metal ferrules to the ends of a dissolvable core having an outer contour corresponding to that desired for the internal surface of a waveguide, metallizing the outer surface of the core, silver plating the metallized surface, securing connecting flanges to said ferrules, wrapping a glass cloth about the core in the region between the said flanges, applying into the glass cloth a resinous material to form a reinforced supporting element, curing said resinous material and dissolving the core to remove it.

6. The method of forming a wave-transmitting element, which comprises applying metallic ends to a core the outer contour of which coincides with the desired internal contour of the wave-transmitting element, applying a conducting coating to the core, silver plating said conducting coating, applying a copper coating upon the silver coating to provide wall strength, wrapping glass cloth about the metal coated core, impregnating the glass cloth with a bonding epoxy resin, curing said resin, and removing the core.

7. The method of forming a waveguide, comprising the steps of applying metal ferrules to the ends of a dissolvable gypsum core having an outer contour corresponding to that desired for the internal surface of a waveguide, metallizing the outer surface of the core, silver plating the metallized surface, copper plating the silvered surface, applying connecting flanges to the ends of the core, wrapping a glass cloth about the core in the region between the end flanges, bonding a resinous material with the glass cloth about the coated surface, and applying hot water to remove the core.

8. The method of forming a waveguide, comprising the steps of attaching metal ferrules to a gypsum core, spraying the core with silver and butylacetate, plating the sprayed core with silver, coating a copper film upon the silver plated surface, applying a silver cement to the ends of the ferrules and attaching metal flanges, covering the coated surface with a fibrous covering, impregnating the covering with an epoxy resin, vacuum curing the resin, and dissolving the core in hot water.

(References on following page)

References Cited in the file of this patent

UNITED STATES PATENTS

| | | |
|---|---|---|
| 2,525,070 | Greenwald et al. | May 17, 1948 |
| 2,552,599 | Stout | May 15, 1951 |
| 2,594,838 | Alexander et al. | Apr. 29, 1952 |
| 2,653,887 | Slayter | Sept. 29, 1953 |
| 2,681,412 | Webster | June 15, 1954 |

FOREIGN PATENTS

| | | |
|---|---|---|
| 691,128 | Great Britain | May 6, 1953 |

OTHER REFERENCES

Electronics—"Electroforming," March 1946, vol. 19, pages 134–138.

U. S. DEPARTMENT OF COMMERCE
PATENT OFFICE

CERTIFICATE OF CORRECTION

Patent No. 2,826,524                                  March 11, 1958

Robert D. Molloy

It is hereby certified that error appears in the printed specification of the above numbered patent requiring correction and that the said Letters Patent should read as corrected below.

Column 1, line 28, for "external" read --internal--.

Signed and sealed this 6th day of May 1958.

(SEAL)
Attest:
KARL H. AXLINE
Attesting Officer

ROBERT C. WATSON
Commissioner of Patents